(12) United States Patent
Ormerod et al.

(10) Patent No.: US 6,474,925 B1
(45) Date of Patent: Nov. 5, 2002

(54) LINEAR PERSONALIZATION MACHINE

(75) Inventors: Simon Ormerod, Loury; Jean-Marc Bernard, La Chapelle Saint Mesmin; Francis Perin, Gidy, all of (FR)

(73) Assignee: Gilles Leroux S.A., Semoy (FR)

( * ) Notice: Subject to any disclaimer, the term of this patent is extended or adjusted under 35 U.S.C. 154(b) by 0 days.

(21) Appl. No.: 09/375,394

(22) Filed: Aug. 17, 1999

(51) Int. Cl.[7] .............................................. B65G 1/10
(52) U.S. Cl. ........................ 414/331.16; 414/331.15; 414/331.01
(58) Field of Search ................ 414/331.01, 331.14, 414/331.15, 331.16

(56) References Cited

U.S. PATENT DOCUMENTS

| | | | | |
|---|---|---|---|---|
| 3,902,615 A | * | 9/1975 | Levy et al. ......... | 414/331.15 X |
| 4,373,846 A | * | 2/1983 | Charbonnet ............ | 414/331.16 |
| 4,725,182 A | * | 2/1988 | Sakamoto et al. ... | 414/331.4 X |
| 5,203,661 A | * | 4/1993 | Tanita et al. ........... | 414/331.16 |
| 6,045,318 A | * | 4/2000 | Mochida et al. .... | 414/331.15 X |

FOREIGN PATENT DOCUMENTS

| | | | | |
|---|---|---|---|---|
| JP | 62-99046 A | * | 5/1987 | .................. 414/331 |
| JP | 62-175365 A | * | 8/1987 | .................. 414/331 |
| JP | 1-290300 A | * | 11/1989 | .................. 414/331 |
| JP | 2-18329 A | * | 7/1990 | .................. 414/331 |

* cited by examiner

*Primary Examiner*—Eileen D. Lillis
*Assistant Examiner*—Thuy V. Tran
(74) *Attorney, Agent, or Firm*—Nixon & Vanderhye P.C.

(57) ABSTRACT

The present invention relates to a linear personalization machine comprising a transfer system (3) for portable objects (4), incorporating an integrated circuit, characterized in that it comprises a personalization elevator (20) translated vertically and sequentially on a guide support (70) by driving end positioning means (29, 73, 28, 75, 72), said elevator (20) being made up of a parallelepiped plate (23) fitted wits a plurality of connection devices whether or not mixed type (22i, 22n) connecting to the integrated circuit of portable objects (4) that are brought in sequential manner in front of an incoming/outgoing station or the transfer line.

12 Claims, 4 Drawing Sheets

LINEAR PERSONALIZATION MACHINE

FIELD OF THE INVENTION

The present invention relates to a linear personalization machine.

BACKGROUND OF THE INVENTION

Personalization machines of the prior art are made up of a rotating platform comprising a plurality of connection devices each associated with a card from a plurality of memory cards. These personalization machines are arranged in a card processing line comprising a unstacking device, an electric testing station, two ejection stations, a turnover station, an ink marking station and a stacking .station. When in operation, the unstacking device ejects a memory card at regular intervals onto a transfer system (3) for portable objects. At the electric testing station the quality of the electronic chips for the cards is checked. Any faulty memory cards are expelled from the processing line system while valid cards are routed towards the personalization station. Personalization consists of entering instructions and/or information into each memory card which are particular to the card or particular to the application. This information is entered either via magnetic waves into contactless cards or via pins into contact cards, or for mixed-type contact and contactless cards by either one or by both of these insertion means. After personalization, the faulty cards are ejected by a further ejection station, while non-faulty cards are optionally returned to be ink or laser marked recto verso, then stacked at a stacking station. A computer system manages the personalization of all the cards. A personalization machine of this type is disclosed by patent application FR 96 03910 filed by the same applicant.

OBJECTS AND SUMMARY OF THE INVENTION

The purpose of the present invention is to provide a linear personalization machine of simpler, less costly construction.

This linear personalization machine may easily be adapted in lieu and stead of a conventional personalization machine. Also, this personalization machine is more compact as it takes up less space on a card processing line. With this advantage, card processing lines of shorter length can be built.

This purpose is attained through the fact that the linear personalization machine, comprising a transfer system for portable objects, incorporating an integrated circuit, is characterised in that it comprises a personalization elevator that is translated vertically and sequentially on a guide support by driving and positioning means, said elevator being made up of a parallelepiped plate fitted with a plurality of connection devices, of mixed or unmixed type, connecting to the integrated circuit of the, portable objects, that are brought in sequential manner in front of an incoming/outgoing station on the transfer line.

According to one particular aspect of the present invention, said guide support is made up of parallelepiped plate whose length is approximately equal to twice the length of said personalization elevator, and comprises a vertical slit, two vertical rails and two pulleys joined together by a belt.

According to another particular aspect, the driving and positioning means are made up of a means to hold and slide said elevator on said rails of said guide support, a driving fixation fixing the elevator firmly to the belt of the guide support, the vertical slit of the guide support forming a track for the driving fixation of said elevator, the driving and positioning means also enabling each fixed platform to be brought to a halt level with the portable objects in the alignment of said transfer system for portable objects.

According to a further particular aspect, said belt of said guide support is periodically set in motion by an electric motor or other power means such that the up and down movements of said elevator along the guide support are regularly interrupted at the level of the incoming/outgoing position on the transfer line so as to allow loading and unloading of the portable objects.

According to another particular aspect, the driving fixation located in the center of said parallelepiped plate comprises means, at its end point, for anchoring to said belt of said guide support.

A further purpose of the invention is to provide a faster personalization machine. This purpose is reached though the fact that the linear personalization machine comprises a decoder package connected to each first parallel port of each personalization card by an address bus and a data bus, said personalization cards being connected in parallel to a backplane computer via a second parallel port. The form of the present personalization machine combined with a new device means that said personalization information can be sent in parallel.

A third object of the invention is to provide a personalization machine which is able to test the electric quality of an electronic chip or the quality of a magnetic strip of a portable object both before and after its personalization. With this personalization machine it is also possible to re-launch card personalization automatically whenever personalization is faulty.

This purpose is achieved through the fact that the connection devices can test the electronic chips and activate the electric contacts and/or contactless terminals of said portable objects.

According to one particular aspect of the invention, when the connection devices have detected a faulty portable object, the latter is expelled from said elevator before its personalization.

According to another particular aspect, the personalization machine comprises computer means for personalization control and management.

According to another particular aspect, said means for personalization control and management trigger a substitution .sequence whenever a personalization defect on a portable object is signaled.

According to another particular aspect, the connection, devices test the quality of the personalization of the portable objects and signal any personalization defects to the control and management means.

According to a further particular aspect; an ejection station located at the exit of said personalization machine tests the quality of personalization of the portable objects and signals any personalization defects to the control and management means.

Other particular aspects and advantages of the present invention will be clearer understood on reading the following description with reference to the appended drawings.

DESCRIPTION OF THE PREFERRED EMBODIMENTS

Figure 3:
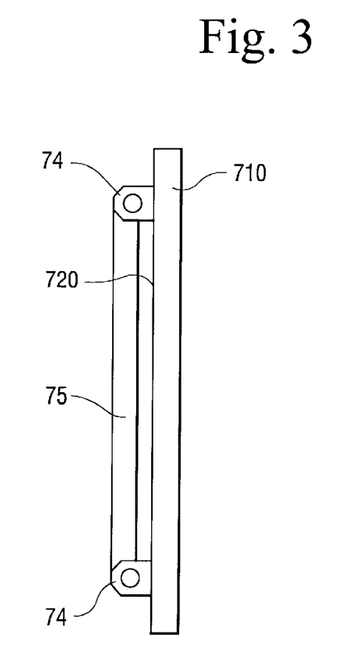
FIG. 3 shows a side view of a guide support according to FIG. 2.
Figure 4:
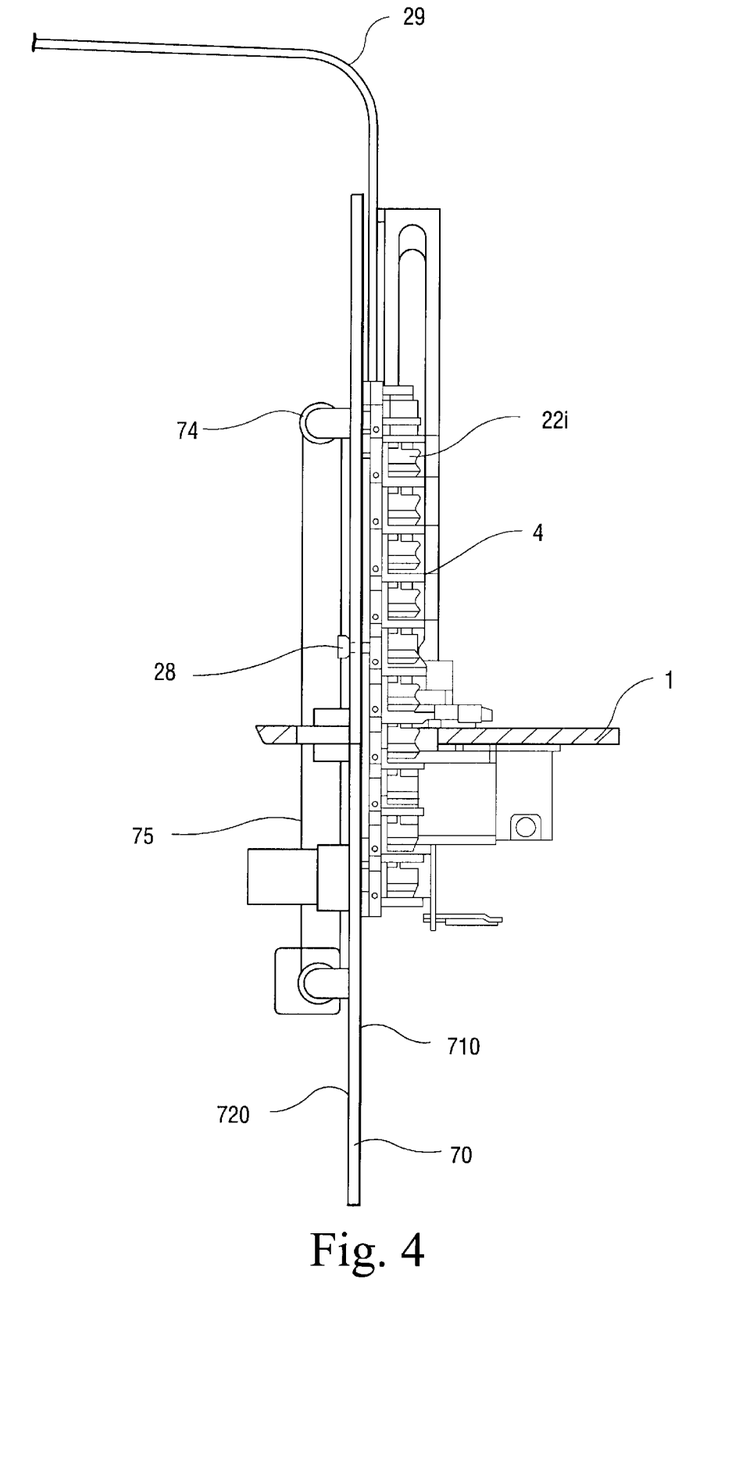
FIG. 4 shows a side view of the linear personalization machine in a card processing line.
Figure 5:
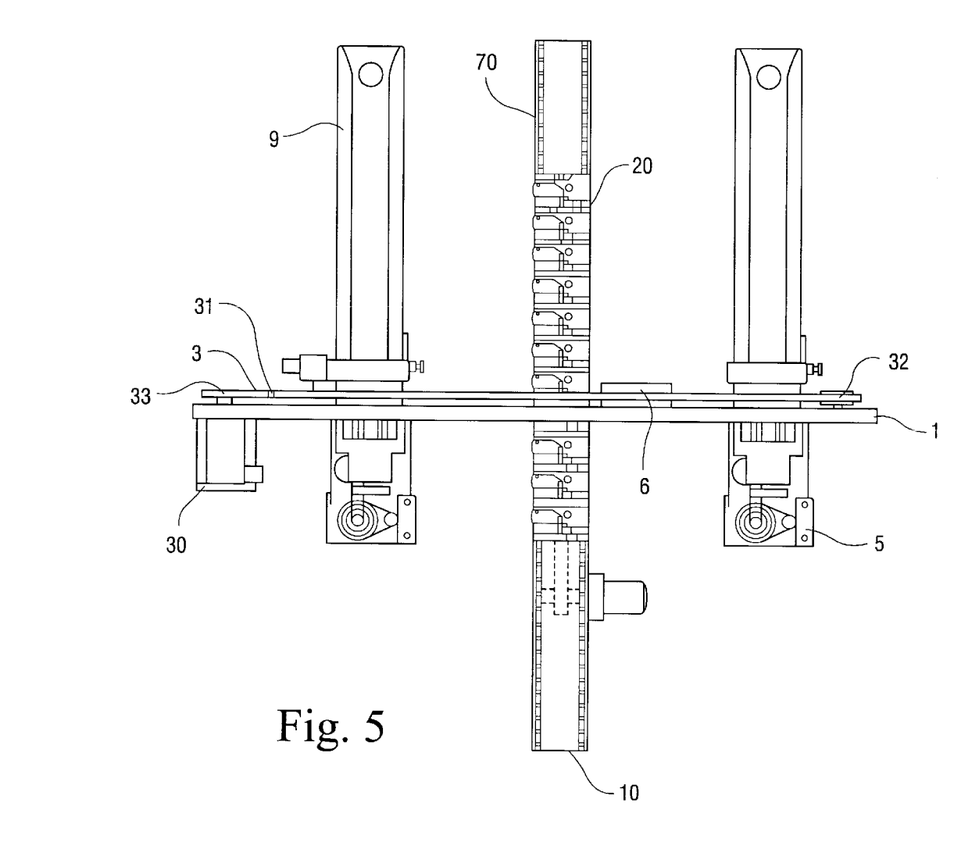
FIG. 5 shows a front view of the personalization machine according to FIG. 4.

The invention which is to be disclosed in connection with FIGS. 1 to 6 comprises a table (1) on which is arranged a card processing line. FIG. 5 shows a front view of a processing line successively comprising an unstacking station (9), at which the cards are stored in a pile prior to their personalization, a linear personalization machine (10) an ejection station (6) which tests the cards and expels faulty cards from the processing line, and finally a stacker (5) of personalized cards. A transfer system (3) allows the memory cards to be taken from one station to another. It is formed by a continuous notched belt (31) circulating between two pulleys (33, 32) driven by a motor (30). On this endless belt (31) stops are mounted to hold the cards in place during their transfer to permit their extraction and depositing by each of the personalization heads (22i, 22n) of the elevator.

The personalization machine comprises a personalization elevator translated vertically over a guide carrier (70) by driving and positioning means.

Figure 1:
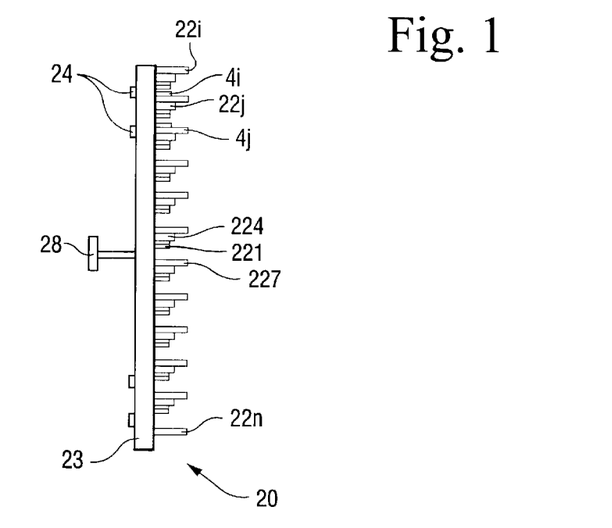
FIG. 1 shows a side view of a personalization elevator

The personalization elevator (20) shown in FIG. 1 is made up of parallelepiped plate (23) provided on one of its surfaces, having the greatest surface area, with a plurality of connection devices forming personalization heads (22i, 22n) and, on its opposite surface, with a driving fixation (28) and sliding guide means (24), for example lateral means, for guiding by sliding in a rail. These sliding guide means may for example be made up of a runner.

Personalization may be made using so-called "chip" cards or "integrated circuit" cards, whose integrated circuit is connected to the outside world either by contacts whose contact areas are each connected by conductors to the entry points of the integrated circuit, or by an antenna. In this case, the card is a so-called "contactless" card and communicates by Hertzian waves or electromagnetic waves with another antenna connected either to a terminal or to the personalization machine. Or the card may be of mixed type comprising both a connection means by contact with a terminal or to the personalization machine and contactless connection means to the terminal or personalization machine. Therefore, through the use of contacts (225) of the connection head (224) or through the use of the antenna (2271) of the fixed platform (227) the personalization machine is able to personalize .contact cards, contactless cards or mixed-type cards. Each connection device (22i) therefore comprises it fixed platform (227) integral with plate (23) and a connection head (224).

Figure 2:
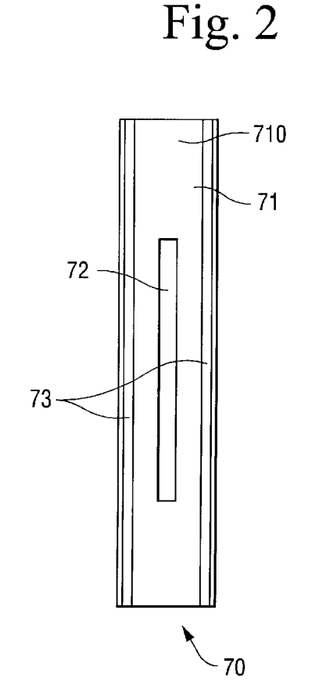
FIG. 2 shows a front view of a guide support according to the invention.

FIGS. 2 and 3 show a front and side view of the guide support (70). It is made up of a parallelepiped plate (71) whose length is approximately equal to twice the length of the personalization elevator (20). Said plate (71) comprises, at its center, a vertical slit (72) that is sufficiently wide to allow entry of the driving fixation (28) of elevator (20). The length of slit 172) is approximately equal to the length of the personalization elevator (20) such that elevator (20) can slide from top downwards over the entire surface of the guide support 170). Also, two vertical rails (73) are arranged on the surface (710) having the greatest surface area of plate 171). And surface (720) of plate (71) parallel to surface (710) comprises two pulleys (74) joined together by belt (75).

When in operation, personalization elevator (20) is translated vertically on guide support (70). For this purpose, driving fixation (28) of elevator (20) is inserted in slit (72) of the guide support and is then firmly anchored to belt (75). Finally, belt (75) of said Guide support (70) is set in motion by means of an electric motor or other power means. Belt (75) when moving causes driving fixation (28) to move, said slit (72) forming a track for driving fixation (28). Consequently, via belt (75) and driving fixation (28) the power means moves the elevator along the guide support. The motor supply is periodically cut off when the fixed platform (227) of a connection device (22i) that is free or respectively engaged is level with the portable objects (4) located in transfer system (3) such as to allow their respective loading and unloading on or off personalization elevator (20).

Figure 6:
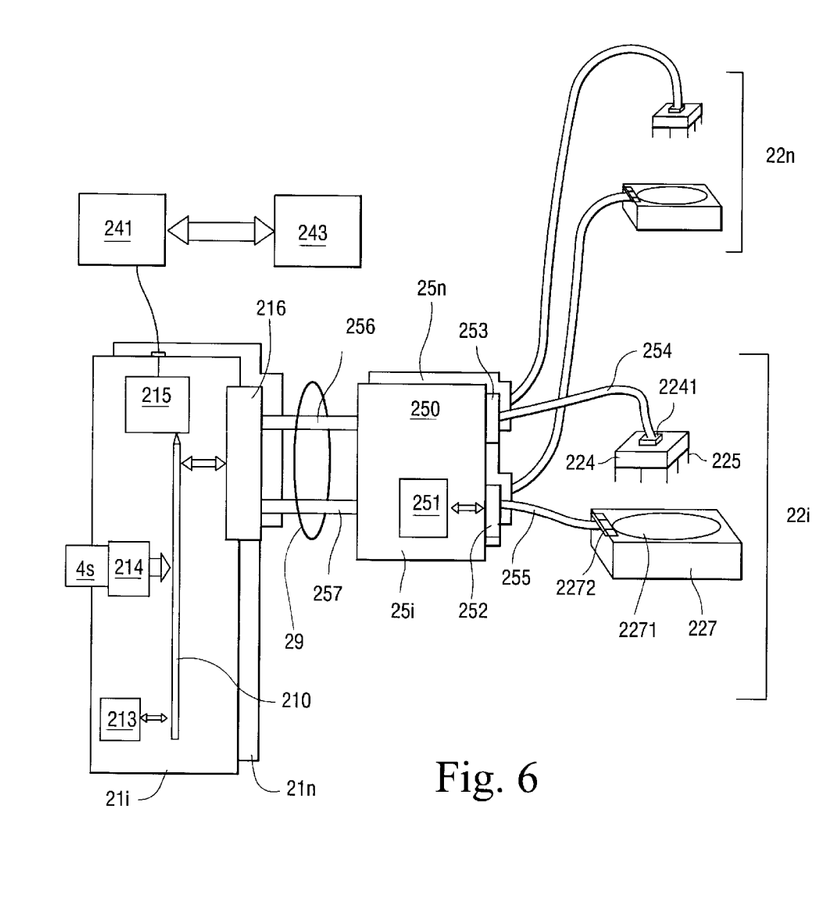
FIG. 6 shows a diagram of the electronic circuits required for the personalization of contact, contactless, or mixed-type cards.

Connection devices (22i) comprise a fixed platform (227) integral with parallelepiped plate (23) and a mobile element (221) carrying a connection head (224). With each connection head (224) and each fixed platform (227) of a connection device (22i, 22n) a personalization card (21i, 21n) is associated, positioned in a personalization rack by a connection cable (29). As shown in FIG. 6, each connection head (224) comprises a plurality of pins (225) mounted or elastic means and electrically connected to a connector (2241) which ensures connection to a wire sheet (254) connected by another connector (253) to a decoder package (250) for addressing and routing data towards the head whose address corresponds to the one transmitted on the address bus. Fixed platform (227) is in non-conductor material such as a plastic material and, embedded in its mass, comprises a, transmission and reception antenna (2271) which is connected by a connector (2272) and a wire (255) to a second connector (252) of decoder package (250). This package comprises an antenna interface circuit (251) and is connected to the electronic personalization boards by an address bus (257) and a data bus (256). Address bus (257) and data bus (256) forming cable (29) are connected to the personalization boards (21i) by a parallel port (216). One bus (210) of the personalization board is also connected to the parallel port (216). Bus (210) is also connected to a microprocessor of the personalization board which executes the personalization program of the electronic cards, which program is loaded in a memory (213) of board (21i). Finally the microprocessor also has access, via bus (210) and connector (214) connected to this bus (210) to a security memory card (4s) so-called "mother" card whose function is to provide the security information needed for personalization. Finally, bus (210) of each board is connected by a parallel post (215) to a backplane computer (241). Another computer of P.C. type (243) having a parallel connection with the first computer manages machine control and receives information from the positioning and detection devices such as, for example, the device ensuring the positioning of a chip card to be personalized on the fixed platform (227) of a connection device. The personalization program loaded in the memory (213) recognizes card types and has an algorithm and the necessary instructions to address information to the connection devices (22i, 22n) by connector (253) and (252) respectively which correspond to contact cards and contactless cards respectively. For mixed-type cards decoder package (250) will give access to the card via contact connector (253) for personalization of some so-called "non-security" parts and will access the card via connector (252) connecting with the antenna to transmit security information via the contactless part. This security information is taken from a "mother" security card (4s) by connector (214) during the personalization of so-called "security" functions or applications. Therefore, the personalization program will comprise means of selectively addressing information towards either one of the connectors.

When in operation, the memory or chip cards are loaded from the transfer system (3) onto fixed platform (227) of the connection devices using an already known card loading and unloading device. Said device, for example of jack type, permits proper positioning of each card on the fixed part (227) of connection device (22i). For more details on the card loading and unloading device reference can be made to patent application FR 9803410 filed by the same applicant. When a card (4i) is loaded on the fixed platform (227) of the connection device (22i), elevator (20) respectively moves up or down over a distance equal to the distance separating two contiguous connection devices (22i, 22j) and another chip card (4i) is loaded onto fixed platform (227) of the following connection device (22j). These respective stages of upward and downward movement and of card loading are repeated until all the connection devices are loaded. Then elevator (20) moves down, respectively moves up, such that the first connection device is level with the transfer line. The first card (4i) which was loaded in the elevator is unloaded from the fixed platform (227) of connection device (22i) onto the transfer line and a new chip card to be personalized is loaded on connection device (22i). During the personalization phase of this new chip card, elevator (20) moves down, respectively moves upwards, over a distance equal to the distance separating the two contiguous connection devices and a new unloading phase of a personalized chip card and loading of a non-personalized chip card begins.

According to another embodiment of the invention, the mixes-type connection device of the personalization elevator comprises an electrical testing device which tests the memory or chip cards as soon as they arrive on the fixed platform (227). If the loaded memory or chip card is faulty, it is directly unloaded from the elevator (20) onto transfer system (3) then expelled by the ejection station (6) and the personalization elevator is loaded with a new memory or chip card. If this card is valid, the elevator moves up or down such that a new chip card may be loaded on the following fixed platform.

Other modifications within the reach of persons skilled in the art also come under the spirit of the invention.

What is claimed is:

1. Linear personalization machine, comprising a transfer system (3) for conveying, along a transfer line, portable objects (4), incorporating an integrated circuit, and further including a personalization elevator (20) translated vertically and sequentially on a guide support (70) by a driving and positioning arrangement (24, 73, 28, 75, 72), said elevator (20) being made up of a parallelepiped mobile plate (23) fitted with a plurality of fixed platforms (227), each fixed platform including connection devices (22i, 22n) connecting to the integrated circuit of portable objects (4) loaded in said platform, said fixed platforms (227) being loaded through an incoming/outgoing arrangement for receiving said portable objects (4) on a position on the transfer line.

2. Linear personalization machine in accordance with claim 1, wherein said guide support (70) is made up of a parallelepiped support plate (71) whose length is approximately equal to twice the length of said personalization elevator (20), comprising a vertical slit (72), two vertical rails (73) and two pulleys (74) joined together by an elevator belt (75).

3. Linear personalization machine in accordance with claim 2, wherein the driving and positioning arrangement comprises a holder (24) for holding in place and sliding said elevator (20) in said rails (73), and a driving fixation (28) firmly anchoring said elevator (20) to said elevator belt (75), the vertical slit (72) of guide support (70) forming a track for the driving fixation (28) of said elevator (20), the driving and positioning arrangement allowing each fixed platform (227) to be brought to a halt level with the portable objects (4) conveyed by said transfer system (3).

4. Linear personalization machine according to claim 2, wherein said belt (75) of said guide support (70) is periodically set in motion by a motor such that the upward and downward movements of said elevator (20) along the guide support (70) are regularly interrupted at the level of the incoming/outgoing arrangement position on the transfer line to enable the loading and unloading of portable objects (4).

5. Linear personalization machine in accordance with claim 3, wherein the driving fixation (28) is located at the center of said parallelepiped plate (23) and comprises, at its end point, a connector for anchoring to said elevator belt (75) of said guide support (70).

6. Linear personalization machine in accordance with claim 1, further comprising a decoder package (250) connected, by an address bus (257) and a data bus (258), to a plurality of personalization cards (21i) by a first parallel port (216) of the card, each of said personalization cards (21i) controlling one of the connection devices (22i, 22n) and being connected in parallel to a backplane computer (241) via a second parallel port (215).

7. Linear personalization machine according to claim 1, wherein the connection devices (22i) enable testing of the electronic chips and activation of the electric contacts and/or contactless terminals of said portable objects (4).

8. Linear personalization machine in accordance with claim 7, wherein when the connection devices (22) have detected a faulty portable object (4), the portable object is unloaded from said elevator (20) before personalization thereof.

9. Linear personalization machine according to claim 1, further comprising a computerized control and management (243) for controlling and managing execution of personalization processes, portable objects (4, 4i, 4j) positions, connecting device (22i, 22n) positions and/or connection quality.

10. Linear personalization machine in accordance with claim 9, wherein said personalization control and management system (243) triggers a substitution sequence whenever a personalization defect on a portable object (4) is signaled.

11. Linear personalization machine in accordance with claim 10, wherein the connection devices (22i) and/or personalization card (21i) test the quality and/or content of the personalization of the portable objects (4) and signal any personalization defects to the control and management system (243).

12. Linear personalization machine in accordance with claim 9, wherein an ejection station (6) located at the exit of said personalization machine (10) tests the quality of personalization of the portable objects (4) and signals any personalization defects to the control and management system (243).

* * * * *

(12) EX PARTE REEXAMINATION CERTIFICATE (6417th)
United States Patent
Ormerod et al.

(10) Number: US 6,474,925 C1
(45) Certificate Issued: Sep. 2, 2008

(54) LINEAR PERSONALIZATION MACHINE

(75) Inventors: Simon Ormerod, Loury (FR);
Jean-Marc Bernard, La Chapelle Saint Mesmin (FR); Francis Perin, Gidy (FR)

(73) Assignee: Datacard Corporation, Minnetonka, MN (US)

Reexamination Request:
No. 90/008,208, Aug. 31, 2006

Reexamination Certificate for:
Patent No.: 6,474,925
Issued: Nov. 5, 2002
Appl. No.: 09/375,394
Filed: Aug. 17, 1999

(51) Int. Cl.
*B65G 1/10* (2006.01)
*G06K 17/00* (2006.01)

(52) U.S. Cl. ............................. 414/331.16; 414/331.01; 414/331.15

(58) Field of Classification Search .............. 414/331.01, 414/331.14, 381.15, 331.16
See application file for complete search history.

(56) References Cited

U.S. PATENT DOCUMENTS

| | | | |
|---|---|---|---|
| 4,368,972 A | 1/1983 | Naramore | |
| 4,519,600 A | 5/1985 | Warwick et al. | |
| 4,643,626 A | 2/1987 | Noguchi et al. | |
| 4,686,898 A | 8/1987 | LaManna et al. | |
| 4,755,069 A | 7/1988 | LaManna et al. | |
| 4,798,322 A | 1/1989 | Bernstein et al. | |
| 4,827,425 A | 5/1989 | Linden | |
| 4,868,373 A | 9/1989 | Opheij et al. | |
| 5,015,834 A | 5/1991 | Suzuki et al. | |
| 5,136,343 A | 8/1992 | Braswell | |
| 5,175,418 A | 12/1992 | Tanaka | |
| 5,212,373 A | 5/1993 | Fujioka et al. | |
| 5,332,889 A | 7/1994 | Lundstrom | |
| 5,370,384 A | 12/1994 | Romanowski | |
| 5,397,426 A | 3/1995 | Nioche et al. | |
| 5,412,192 A | 5/1995 | Hoss | |
| 5,412,253 A | 5/1995 | Hough | |
| 5,434,917 A | 7/1995 | Naccache et al. | |
| 5,650,757 A | 7/1997 | Barber | |
| 5,664,157 A | 9/1997 | Takahira et al. | |
| 5,671,374 A | 9/1997 | Postman et al. | |
| 5,727,230 A | 3/1998 | Fujioka | |
| 5,734,961 A | 3/1998 | Castille | |
| 5,837,991 A | 11/1998 | LaManna et al. | |
| 6,283,368 B1 | 9/2001 | Ormerod et al. | |

FOREIGN PATENT DOCUMENTS

| | | |
|---|---|---|
| FR | 2766945 | 2/1999 |
| JP | 57 102447 | 6/1982 |
| JP | 61-249183 | 11/1986 |
| JP | 4-65244 | 6/1992 |
| JP | 11-167609 | 6/1999 |

OTHER PUBLICATIONS

EC Hancock et al.; "Collator"; IBM Technical Disclosure Bulletin; May 1979; pp. 4776–4779.
JW Spears; "Collator for Document Copier"; IBM Technical Disclosure Bulletin; Aug. 1971; pp. 906–907.

*Primary Examiner*—Matthew C. Graham (57) ABSTRACT

The present invention relates to a linear personalization machine comprising a transfer system (3) for portable objects (4), incorporating an integrated circuit, characterized in that it comprises a personalization elevator (20) translated vertically and sequentially on a guide support (70) by driving end positioning means (29, 73, 28, 75, 72), said elevator (20) being made up of a parallelepiped plate (23) fitted wits a plurality of connection devices whether or not mixed type (22i, 22n) connecting to the integrated circuit of portable objects (4) that are brought in sequential manner in front of an incoming/outgoing station or the transfer line.

US 6,474,925 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 4 and 6 are determined to be patentable as amended.

Claims 5 and 7–12, dependent on an amended claim, are determined to be patentable.

New claims 13, 14–36 and 37–49 are added and determined to be patentable.

Other new claims 14 and 38 are cancelled.

1. Linear personalization machine, comprising a transfer system (3) for conveying, along a transfer line, portable objects (4), incorporating an integrated circuit, and further including a personalization elevator (20) translated vertically and sequentially on a guide support (70) by a driving and positioning arrangement (24, 73, 28, 75, 72), said elevator (20) being made up of a parallelepiped mobile plate (23) fitted with a plurality of fixed platforms (227), each fixed platform including connection devices (22i, 22n) connecting to the integrated circuit of portable objects (4) loaded in said platform, said fixed platforms (227) being loaded through an incoming/outgoing arrangement for receiving said portable objects (4) on a position on the transfer line, *and said guide support (70) is made up of a parallelepiped support plate (71) whose length is approximately equal to twice the length of said personalization elevator (20), comprising a vertical slit (72), two vertical rails (73) and two pulleys (74) joined together by an elevator belt (75)*.

3. Linear personalization machine in accordance with claim [2] *1*, wherein the driving and positioning arrangement comprises a holder (24) for holding in place and sliding said elevator (20) in said rails (73), and a driving fixation (28) firmly anchoring said elevator (20) to said elevator belt (75), the vertical slit (72) of guide support (70) forming a track for the driving fixation (28) of said elevator (20), the driving and positioning arrangement allowing each fixed platform (227) to be brought to a halt level with the portable objects (4) conveyed by said transfer system (3).

4. Linear personalization machine in accordance to claim [2] *1*, wherein said belt (75) of said guide support (70) is periodically set in motion by a motor such that the upward and downward movements of said elevator (20) along the guide support (70) are regularly interrupted at the level of the incoming/outgoing arrangement position on the transfer line to enable the loading and unloading of portable objects (4).

6. Linear personalization machine [in accordance with claim 1], [further] comprising *a transfer system (3) for conveying, along a transfer line, portable objects (4), incorporating an integrated circuit, and further including a personalization elevator (20) translated vertically and sequentially on a guide support (70) by a driving and positioning arrangement (24, 73, 28, 75, 72), said elevator (20) being made up of a parallelepiped mobile plate (23) fitted with a plurality of fixed platforms (227), each fixed platform including connection devices (22i, 22n) connecting to the integrated circuit of portable objects (4) loaded in said platform, said fixed platforms (227) being loaded through an incoming/outgoing arrangement for receiving said portable objects (4) on a position on the transfer line, and* a decoder package (250) connected, by an address bus (257) and a data bus (258), to a plurality of personalization cards (21i) by a first parallel port (216) of the card, each of said personalization cards (21i) controlling one of the connection devices (22i, 22n) and being connected in parallel to a backplane computer (241) via a second parallel port (215).

*13. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including personalization heads, each personalization head includes at least one of a contact and contactless connection device connecting to the integrated circuit of portable objects loaded in said platform, said fixed platforms being loaded through an incoming/outgoing arrangement for receiving said portable objects on a position on the transfer line,*
    *wherein said guide support is made up of a parallelepiped support plate whose length is approximately equal to twice the length of said personalization elevator, comprising a vertical slit, two vertical rails and two pulleys joined together by an elevator belt.*

*14. Linear personalization machine in accordance with claim 13, wherein the driving and positioning arrangement comprises a holder for holding in place and sliding said elevator in said rails, and a driving fixation firmly anchoring said elevator to said elevator belt, the vertical slit of guide support forming a track for the driving fixation of said elevator, the driving and positioning arrangement allowing each fixed platform to be brought to a halt level with the portable objects conveyed by said transfer system.*

*15. Linear personalization machine according to claim 13, wherein said belt of said guide support is periodically set in motion by a motor such that the upward and downward movements of said elevator along the guide support are regularly interrupted at the level of the incoming/outgoing arrangement position on the transfer line to enable the loading and unloading of portable objects.*

*16. Linear personalization machine in accordance with claim 14, wherein the driving fixation is located at the center of said parallelepiped plate and comprises, at its end point, a connector for anchoring to said elevator belt of said guide support.*

*17. Linear personalization machine in accordance with claim 13, further comprising a decoder package connected, by an address bus and a data bus, to a plurality of personalization cards by a first parallel port of the card, each of said personalization cards controlling one of the connection devices and being connected in parallel to a backplane computer via a second parallel port.*

*18. Linear personalization machine according to claim 13, wherein the connection devices enable testing of elec-* tronic chips and activation of the contacts and/or contactless terminals of said portable objects.

19. Linear personalization machine in accordance with claim 18, wherein when the connection devices have detected a faulty portable object, the portable object is unloaded from said elevator before personalization thereof.

20. Linear personalization machine according to claim 13, further comprising a computerized control and management for controlling and managing execution of personalization processes, portable objects positions, connecting device positions and/or connection quality.

21. Linear personalization machine in accordance with claim 20, wherein said personalization control and management system triggers a substitution sequence whenever a personalization defect on a portable object is signaled.

22. Linear personalization machine in accordance with claim 21, wherein the connection devices and/or personalization card test the quality and/or content of the personalization of the portable objects and signal any personalization defects to the control and management system.

23. Linear personalization machine in accordance with claim 20, wherein an ejection station located at the exit of said personalization machine tests the quality of personalization of the portable objects and signals any personalization defects to the control and management system.

24. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including connection devices connecting to the integrated circuit of portable objects loaded in said platform, the connection devices of each fixed platform including a contact connection device to perform contact personalization and a contactless connection device to perform contactless personalization, said fixed platforms being loaded through an incoming/outgoing arrangement for receiving said portable objects on a position on the transfer line.

25. Linear personalization machine in accordance with claim 24, wherein said guide support is made up of a parallelepiped support plate whose length is approximately equal to twice the length of said personalization elevator, comprising a vertical slit, two vertical rails and two pulleys joined together by an elevator belt.

26. Linear personalization machine in accordance with claim 25, wherein the driving and positioning arrangement comprises a holder for holding in place and sliding said elevator in said rails, and a driving fixation firmly anchoring said elevator to said elevator belt, the vertical slit of guide support forming a track for the driving fixation of said elevator, the driving and positioning arrangement allowing each fixed platform to be brought to a halt level with the portable objects conveyed by said transfer system.

27. Linear personalization machine according to claim 25, wherein said belt of said guide support is periodically set in motion by a motor such that the upward and downward movements of said elevator along the guide support are regularly interrupted at the level of the incoming/outgoing arrangement position on the transfer line to enable the loading and unloading of portable objects.

28. Linear personalization machine in accordance with claim 26, wherein the driving fixation is located at the center of said parallelepiped plate and comprises, at its end point, a connector for anchoring to said elevator belt of said guide support.

29. Linear personalization machine in accordance with claim 24, further comprising a decoder package connected, by an address bus and a data bus, to a plurality of personalization cards by a first parallel port of the card, each of said personalization cards controlling one of the connection devices and being connected in parallel to a backplane computer via a second parallel port.

30. Linear personalization machine according to claim 24, wherein the connection devices enable testing of electronic chips and activation of the contacts and/or contactless terminals of said portable objects.

31. Linear personalization machine in accordance with claim 30, wherein when the connection devices have detected a faulty portable object, the portable object is unloaded from said elevator before personalization thereof.

32. Linear personalization machine according to claim 24, further comprising a computerized control and management for controlling and managing execution of personalization processes, portable objects positions, connecting device positions and/or connection quality.

33. Linear personalization machine in accordance with claim 32, wherein said personalization control and management system triggers a substitution sequence whenever a personalization defect on a portable object is signaled.

34. Linear personalization machine in accordance with claim 33, wherein the connection devices and/or personalization card test the quality and/or content of the personalization of the portable objects and signal any personalization defects to the control and management system.

35. Linear personalization machine in accordance with claim 32, wherein an ejection station located at the exit of said personalization machine tests the quality of personalization of the portable objects and signals any personalization defects to the control and management system.

36. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including connection devices connecting to the integrated circuit of portable objects loaded in said platform, each connection device forming a personalization head, said fixed platforms being loaded through an incoming/outgoing arrangement for receiving said portable objects on a position on the transfer line,
  wherein said guide support is made up of a parallelepiped support plate whose length is approximately equal to twice the length of said personalization elevator, comprising a vertical slit, two vertical rails and two pulleys joined together by an elevator belt.

37. Linear personalization machine in accordance with claim 36, wherein the driving and positioning arrangement comprises a holder for holding in place and sliding said elevator in said rails, and a driving fixation firmly anchoring said elevator to said elevator belt, the vertical slit of guide support forming a track for the driving fixation of said elevator, the driving and positioning arrangement allowing each fixed platform to be brought to a halt level with the portable objects conveyed by said transfer system.

38. Linear personalization machine according to claim 36, wherein said belt of said guide support is periodically set in motion by a motor such that the upward and downward movements of said elevator along the guide support are regularly interrupted at the level of the incoming/outgoing arrangement position on the transfer line to enable the loading and unloading of portable objects.

39. Linear personalization machine in accordance with claim 37, wherein the driving fixation is located at the center of said parallelepiped plate and comprises, at its end point, a connector for anchoring to said elevator belt of said guide support.

40. Linear personalization machine in accordance with claim 36, further comprising a decoder package connected, by an address bus and a data bus, to a plurality of personalization cards by a first parallel port of the card, each of said personalization cards controlling one of the connection devices and being connected in parallel to a backplane computer via a second parallel port.

41. Linear personalization machine according to claim 36, wherein the connection devices enable testing of electronic chips and activation of the contacts and/or contactless terminals of said portable objects.

42. Linear personalization machine in accordance with claim 41, wherein when the connection devices have detected a faulty portable object, the portable object is unloaded from said elevator before personalization thereof.

43. Linear personalization machine according to claim 36, further comprising a computerized control and management for controlling and managing execution of personalization processes, portable objects positions, connecting device positions and/or connection quality.

44. Linear personalization machine in accordance with claim 43, wherein said personalization control and management system triggers a substitution sequence whenever a personalization defect on a portable object is signaled.

45. Linear personalization machine in accordance with claim 44, wherein the connection devices and/or personalization card test the quality and/or content of the personalization of the portable objects and signal any personalization defects to the control and management system.

46. Linear personalization machine in accordance with claim 43, wherein an ejection station located at the exit of said personalization machine tests the quality of personalization of the portable objects and signals any personalization defects to the control and management system.

47. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including personalization heads, each personalization head includes at least one of a contact and contactless connection device connecting to the integrated circuit of portable objects loaded in said platform, said fixed platforms being loaded through an incoming/outgoing arrangement for receiving said portable objects on a position on the transfer line, and a decoder package connected, by an address bus and a data bus, to a plurality of personalization cards by a first parallel port of the card, each of said personalization cards controlling one of the connection devices and being connected in parallel to a backplane computer via a second parallel port.

48. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including connection devices connecting to the integrated circuit of portable objects loaded in said platform, each connection device forming a personalization head, said fixed platforms being loaded through an incoming/outgoing arrangement for receiving said portable objects on a position on the transfer line, wherein said belt of said guide support is periodically set in motion by a motor such that the upward and downward movements of said elevator along the guide support are regularly interrupted at the level of the incoming/outgoing arrangement position on the transfer line to enable the loading and unloading of portable objects.

49. Linear personalization machine, comprising a transfer system for conveying, along a transfer line, portable objects, incorporating an integrated circuit, and further including a personalization elevator translated vertically and sequentially on a guide support by a driving and positioning arrangement, said elevator being made up of a parallelepiped mobile plate fitted with a plurality of fixed platforms, each fixed platform including connection devices connecting to the integrated circuit of portable objects loaded in said platform, each connection device forming a personalization head, said fixed platforms being loaded through an incoming/outgoing arrangement for receiving said portable objects on a position on the transfer line, and a decoder package connected, by an address bus and a data bus, to a plurality of personalization cards by a first parallel port of the card, each of said personalization cards controlling one of the connection devices and being connected in parallel to a backplane computer via a second parallel port.

\* \* \* \* \*

(12) EX PARTE REEXAMINATION CERTIFICATE (7304th)
United States Patent
Ormerod et al.

(10) Number: US 6,474,925 C2
(45) Certificate Issued: Jan. 5, 2010

(54) LINEAR PERSONALIZATION MACHINE

(75) Inventors: Simon Ormerod, Loury (FR); Jean-Marc Bernard, La Chapelle Saint Mesmin (FR); Francis Perin, Gidy (FR)

(73) Assignee: Datacard Corporation, Minnetonka, MN (US)

Reexamination Request:
No. 90/009,173, Jun. 6, 2008

Reexamination Certificate for:
Patent No.: 6,474,925
Issued: Nov. 5, 2002
Appl. No.: 09/375,394
Filed: Aug. 17, 1999

Reexamination Certificate C1 6,474,925 issued Sep. 2, 2008

(51) Int. Cl.
*B65G 1/10* (2006.01)
*G06K 17/00* (2006.01)

(52) U.S. Cl. .............................. 414/331.16; 414/331.01; 414/331.15

(58) Field of Classification Search .................. None
See application file for complete search history.

(56) References Cited

U.S. PATENT DOCUMENTS

| | | | |
|---|---|---|---|
| 4,373,846 A | 2/1983 | Charbonnet | |
| 4,725,182 A | 2/1988 | Sakamoto et al. | |
| 5,332,889 A | 7/1994 | Lundstrom et al. | |
| 5,837,991 A | 11/1998 | LaManna et al. | |
| 5,929,414 A | 7/1999 | Saitoh | |
| 6,283,368 B1 | 9/2001 | Ormerod et al. | |

FOREIGN PATENT DOCUMENTS

FR 2766945 2/1999

OTHER PUBLICATIONS

"NBS Horizon: Smart Card Personalization CPE", (Feb. 1998),2 pages.
"NBS Horizon: Winning the world over with faster, smarter card issuance systems", (Jan. 1999),2 pages.
"Security Surveyor", *Press Cutting from Kestrel Communications Ltd.*, (Jul. 1998), 1 page.

*Primary Examiner*—Jeffrey L. Gellner (57) ABSTRACT

The present invention relates to a linear personalization machine comprising a transfer system (3) for portable objects (4), incorporating an integrated circuit, characterized in that it comprises a personalization elevator (20) translated vertically and sequentially on a guide support (70) by driving end positioning means (29, 73, 28, 75, 72), said elevator (20) being made up of a parallelepiped plate (23) fitted wits a plurality of connection devices whether or not mixed type (22i, 22n) connecting to the integrated circuit of portable objects (4) that are brought in sequential manner in front of an incoming/outgoing station or the transfer line.

EX PARTE REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1 and 3–49 is confirmed.

Claim 2 was previously cancelled.

\* \* \* \* \*